US012632753B2

(12) United States Patent
Foster et al.

(10) Patent No.: US 12,632,753 B2
(45) Date of Patent: May 19, 2026

(54) EFFICIENT REAL-WORLD EXPERIMENTATION USING CAUSAL INFERENCE MODELS

(71) Applicant: Microsoft Technology Licensing, LLC, Redmond, WA (US)

(72) Inventors: Adam Evan Foster, Cambridge (GB); Cheng Zhang, Cambridge (GB); Desislava Rosenova Ivanova, Oxford (GB); Joel Nicholas Jennings, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 789 days.

(21) Appl. No.: 18/051,324

(22) Filed: Oct. 31, 2022

(65) Prior Publication Data

US 2023/0394339 A1 Dec. 7, 2023

Related U.S. Application Data

(60) Provisional application No. 63/347,986, filed on Jun. 1, 2022.

(51) Int. Cl.
*G06N 7/01* (2023.01)

(52) U.S. Cl.
CPC .................................... *G06N 7/01* (2023.01)

(58) Field of Classification Search
CPC ............ G06N 7/01; G06N 7/02; G06N 3/006; G06N 3/045; G06N 3/08; G06N 3/084; G06N 3/02; G06N 3/044; G06N 3/047; G06N 3/088; G06N 3/126; G06N 3/042; G06N 3/0464; G06N 3/0455; G06N 3/09;
(Continued)

(56) References Cited

U.S. PATENT DOCUMENTS 10,318,674 B2 * 6/2019 Morgan .................. G06F 30/20
11,049,043 B2 6/2021 Dalli et al.
(Continued)

FOREIGN PATENT DOCUMENTS

CA 3110395 A1 * 3/2020 ....... G06F 18/24147
WO WO-2022129610 A1 * 6/2022 ............ G06N 3/065

OTHER PUBLICATIONS

Foster, et al., "Deep Adaptive Design: Amortizing Sequential Bayesian Experimental Design", In Repository of arXiv:2103.02438v2, Jun. 11, 2021, 28 Pages.
(Continued)

*Primary Examiner* — Jeffrey P Aiello
(74) *Attorney, Agent, or Firm* — Barta Jones, PLLC

(57) ABSTRACT

An experiment design is determined for a plurality of physical experiment entities, based on a training loss that is dependent on a critic function and an action parameter individually associated with each physical experiment entity, with the aim of increasing (e.g., optimizing) information gain with respect to a plurality of test entities. The training loss encodes a predicted information gain between a predicted experiment outcome and a predicted test quantity. The predicted experiment outcome associated therewith is sampled from a joint probability distribution based on an entity context. A numerical output is computed using the critic function applied to the predicted experiment outcome and the predicted test quantity.

20 Claims, 7 Drawing Sheets

(58) Field of Classification Search

CPC ........ G06N 3/092; G06N 3/048; G06N 3/086; G06N 3/0895; G06N 3/049; G06N 3/096; G06N 5/01; G06N 5/046; G06N 5/04; G06N 5/048; G06N 20/00; G06N 20/10; G06N 20/20; G05B 23/0294; G05B 13/028; G06F 17/18; G06F 18/21; G06F 18/2178; G06F 18/217

USPC ........ 700/108, 28, 29, 19, 95, 9, 1; 702/108, 702/113, 109, 117, 116, 127, 182, 188, 702/183, 189, 181, 185, 179, 81; 703/2, 703/6, 1, 7, 22, 4

See application file for complete search history.

(56) References Cited

U.S. PATENT DOCUMENTS

| | | | | |
|---|---|---|---|---|
| 11,126,493 | B2 | 9/2021 | Guha et al. | |
| 11,354,566 | B1 | 6/2022 | Chen et al. | |
| 2018/0060466 | A1 * | 3/2018 | Morgan | G06F 30/20 |
| 2020/0117492 | A1 | 4/2020 | Natarajan et al. | |
| 2021/0056353 | A1 | 2/2021 | Vahdat et al. | |
| 2021/0142190 | A1 | 5/2021 | Isahagian et al. | |
| 2023/0111115 | A1 * | 4/2023 | Ramarao | G06Q 10/06398 705/7.29 |

OTHER PUBLICATIONS

Ivanova, et al., "CO-BED: Information-Theoretic Contextual Optimization via Bayesian Experimental Design", In Repository of arXiv:2302.14015v1, Feb. 27, 2023, 19 Pages.
Ivanova, et al., "Efficient Real-world Testing of Causal Decision Making via Bayesian Experimental Design for Contextual Optimisation", In Repository of arXiv:2207.05250v1, Jul. 12, 2022, pp. 1-16.
Ivanova, et al., "Implicit Deep Adaptive Design: Policy-Based Experimental Design without Likelihoods", In Repository of arXiv:2111.02329v1, Nov. 3, 2021, pp. 1-33.
Kleinegesse, et al., "Gradient-based Bayesian Experimental Design for Implicit Models using Mutual Information Lower Bounds", In Repository of arXiv:2105.04379v1, May 10, 2021, pp. 1-52.
Lim, et al., "Policy-Based Bayesian Experimental Design for Non-Differentiable Implicit Models", In Repository of arXiv:2203.04272v1, Mar. 8, 2022, 15 Pages.
"International Search Report and Written Opinion issued in PCT Application No. PCT/US23/021606", Mailed Date: Aug. 22, 2023, 16 Pages.
Agrawal, et al., "Thompson Sampling for Contextual Bandits with Linear Payoffs", In Proceedings of 30th International Conference on Machine Learning, May 26, 2013, 9 Pages.
Auer, Peter, "Using Confidence Bounds for Exploitation-Exploration Trade-Offs", In Journal of Machine Learning Research, vol. 3, Nov. 2002, pp. 397-422.
Char, et al., "Offline Contextual Bayesian Optimization", In Proceedings of 33rd Conference on Neural Information Processing Systems, Dec. 8, 2019, 12 Pages.
Chu, et al., "Contextual Bandits with Linear Payoff Functions", In Proceedings of the Fourteenth International Conference on Artificial Intelligence and Statistics, Jun. 14, 2011, pp. 208-214.
Fauvel, et al., "Contextual Bayesian Optimization with Binary Outputs", In Repository of arXiv:2111.03447v1, Nov. 5, 2021, 20 Pages.
Filippi, et al., "Parametric Bandits: The Generalized Linear Case", In Proceedings of 24th Annual Conference on Neural Information Processing Systems, Dec. 6, 2010, 9 Pages.
Frazier, et al., "The Knowledge-Gradient Policy for Correlated Normal Beliefs", In INFORMS Journal on Computing, vol. 21, Issue 4, Nov. 2009, pp. 599-613.
Geffner, et al., "Deep End-to-end Causal Inference", In Repository of arXiv:2202.02195v2, Jun. 20, 2022, 31 Pages.
Ginsbourger, et al., "Bayesian Adaptive Reconstruction of Profile Optima and Optimizers", In SIAM/ASA Journal on Uncertainty Quantification, vol. 2, Issue 1, Sep. 23, 2014, pp. 490-510.
Han, et al., "Sequential Batch Learning in Finite-Action Linear Contextual Bandit", In Repository of arXiv:2004.06321v1, Apr. 14, 2020, 34 Pages.
Kolyshkina, et al., "The CRISP-ML Approach to Handling Causality and Interpretability Issues in Machine Learning", In Proceedings of IEEE International Conference on Big Data, Dec. 15, 2021, pp. 2306-2312.
Krause, et al., "Contextual Gaussian Process Bandit Optimization", In Proceedings of 25th Annual Conference on Neural Information Processing Systems, Dec. 12, 2011, 9 Pages.
Krishnamurthy, et al., "Contextual Bandits with Continuous Actions: Smoothing, Zooming, and Adapting", In Proceedings of 32nd Annual Conference on Learning Theory, Jun. 25, 2019, 3 pages.
Majzoubi, et al., "Efficient Contextual Bandits with Continuous Actions", In Proceedings of 34th Conference on Neural Information Processing Systems, Dec. 6, 2020, 12 Pages.
Metzen, Jan H. , "Active Contextual Entropy Search", In Repository of arXiv:1511.04211v2, Nov. 16, 2015, 6 Pages.
Metzen, et al., "Bayesian Optimization for Contextual Policy Search", In Proceedings of the Second Machine Learning in Planning and Control of Robot Motion Workshop, 2015, 2 Pages.
Oord, et al., "Representation Learning with Contrastive Predictive Coding", In Repository of arXiv:1807.03748v1, Jul. 10, 2018, 13 Pages.
Pearce, et al., "Continuous Multi-Task Bayesian Optimisation with Correlation", In European Journal of Operational Research, vol. 270, Issue 3, Nov. 1, 2018, 31 Pages.
Pearce, et al., "Practical Bayesian Optimization of Objectives with Conditioning Variables", In Repository of arXiv:2002.09996v2, Nov. 2, 2020, 22 Pages.
Si, et al., "Distributional Robust Batch Contextual Bandits", In Repository of arXiv:2006.05630v1, Jun. 10, 2020, 40 Pages.
Sutton, et al., "Reinforcement Learning: An Introduction", In Publication of MIT Press, Nov. 13, 2018, 548 Pages.
Swaminathan, et al., "Counterfactual Risk Minimization: Learning from Logged Bandit Feedback", In Proceedings of 32nd International Conference on Machine Learning, Jul. 6, 2015, 10 Pages.
Turek, Matt, "Explainable Artificial Intelligence (XAI)", Retrieved from: https://www.darpa.mil/program/explainable-artificial-intelligence, Retrieved on: Jul. 13, 2022, 4 Pages.
Wang, et al., "Max-Value Entropy Search for Efficient Bayesian Optimization", In Proceedings of 34th International Conference on Machine Learning, Aug. 6, 2017, 9 Pages.
Zhou, et al., "Neural Contextual Bandits with Ucb-Based Exploration", In Proceedings of 37th International Conference on Machine Learning, Jul. 13, 2020, 11 Pages.
Cranmer, et al., "The Frontier of Simulation-based Inference", In Journal of the National Academy of Sciences, vol. 117, Issue 48, Dec. 1, 2020, pp. 30055-30062.
Foster, et al., "A Unified Stochastic Gradient Approach to Designing Bayesian-Optimal Experiments", In Proceedings of 23rd International Conference on Artificial Intelligence and Statistics, Aug. 26, 2020, 10 Pages.
Green, et al., "Bayesian Computation: A Summary of the Current State, and Samples Backwards and Forwards", In Journal of Statistics and Computing, vol. 25, Issue 4, Jun. 11, 2015, pp. 835-862.
Jang, et al., "Categorical Reparameterization with Gumbel-Softmax", In Repository of arXiv:1611.01144v1, Nov. 3, 2016, 13 Pages.
Kleinegesse, et al., "Efficient Bayesian Experimental Design for Implicit Models", In Proceedings of 22nd International Conference on Artificial Intelligence and Statistics, Apr. 16, 2019, 10 Pages.
Kleinegesse, et al., "Bayesian Experimental Design for Implicit Models by Mutual Information Neural Estimation", In Proceedings of 37th International Conference on Machine Learning, Jul. 13, 2020, 11 Pages.
Lindley, Dennis V. , "On a Measure of the Information Provided by an Experiment", In Journal of the Annals of Mathematical Statistics, vol. 27, Issue 4, Dec. 1956, pp. 986-1005.

(56) References Cited

OTHER PUBLICATIONS

Maddison, et al., "The Concrete Distribution: A Continuous Relaxation of Discrete Random Variables", In Repository of arXiv:1611.00712v1, Nov. 2, 2016, 17 Pages.
Mohamed, et al., "Monte Carlo Gradient Estimation in Machine Learning", In Journal of Machine Learning Research, vol. 21, Issue 132, Jul. 2020, 62 Pages.
Rainforth, et al., "On Nesting Monte Carlo Estimators", In Proceedings of 35th International Conference on Machine Learning, Jul. 10, 2018, 10 Pages.
Zanette, et al., "Design of Experiments for Stochastic Contextual Linear Bandits", In Proceedings of 35th Conference on Neural Information Processing Systems, Dec. 6, 2021, 12 Pages.

* cited by examiner

EFFICIENT REAL-WORLD EXPERIMENTATION USING CAUSAL INFERENCE MODELS

CROSS-REFERENCE TO RELATED APPLICATION

This application claims the benefit of U.S. provisional application No. 63/347,986 filed on Jun. 1, 2022, entitled "Efficient Computer-Implemented Real-World Testing of Causal Inference Models" the entirety of which is hereby incorporated by reference herein.

TECHNICAL FIELD

The present disclosure pertains to computer-implemented methods of testing causal inference models through real-world experiments, and to computer hardware and programs for implementing the same.

BACKGROUND

A standard experimental design procedure is random treatment assignment, in which random actions are applied to different context members (e.g. physical entities on which the experiment is run). For a binary treatment, this corresponds to A/B testing. However, this naive approach has both practical and conceptual drawbacks. The practical drawback of this approach is that involves applying many sub-optimal actions, meaning that the opportunity cost of experimentation becomes high. The aim of an experiment may be to learn about the best possible return for each context member, so gathering information about actions which are known a priori to be sub-optimal is not a good use of experimental resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

An experiment design is determined for a plurality of physical experiment entities, based on a training loss that is dependent on a critic function and an action parameter individually associated with each physical experiment entity, with the aim of increasing (e.g., optimizing) information gain with respect to a plurality of test entities. The training loss encodes a predicted information gain between a predicted experiment outcome and a predicted test quantity. The predicted experiment outcome associated therewith is sampled from a joint probability distribution based on an entity context. A numerical output is computed using the critic function applied to the predicted experiment outcome and the predicted test quantity.

BRIEF DESCRIPTION OF FIGURES

Certain embodiments of the subject matter will now be described by way of example only, with reference to the figures, in which.

Figure 1:
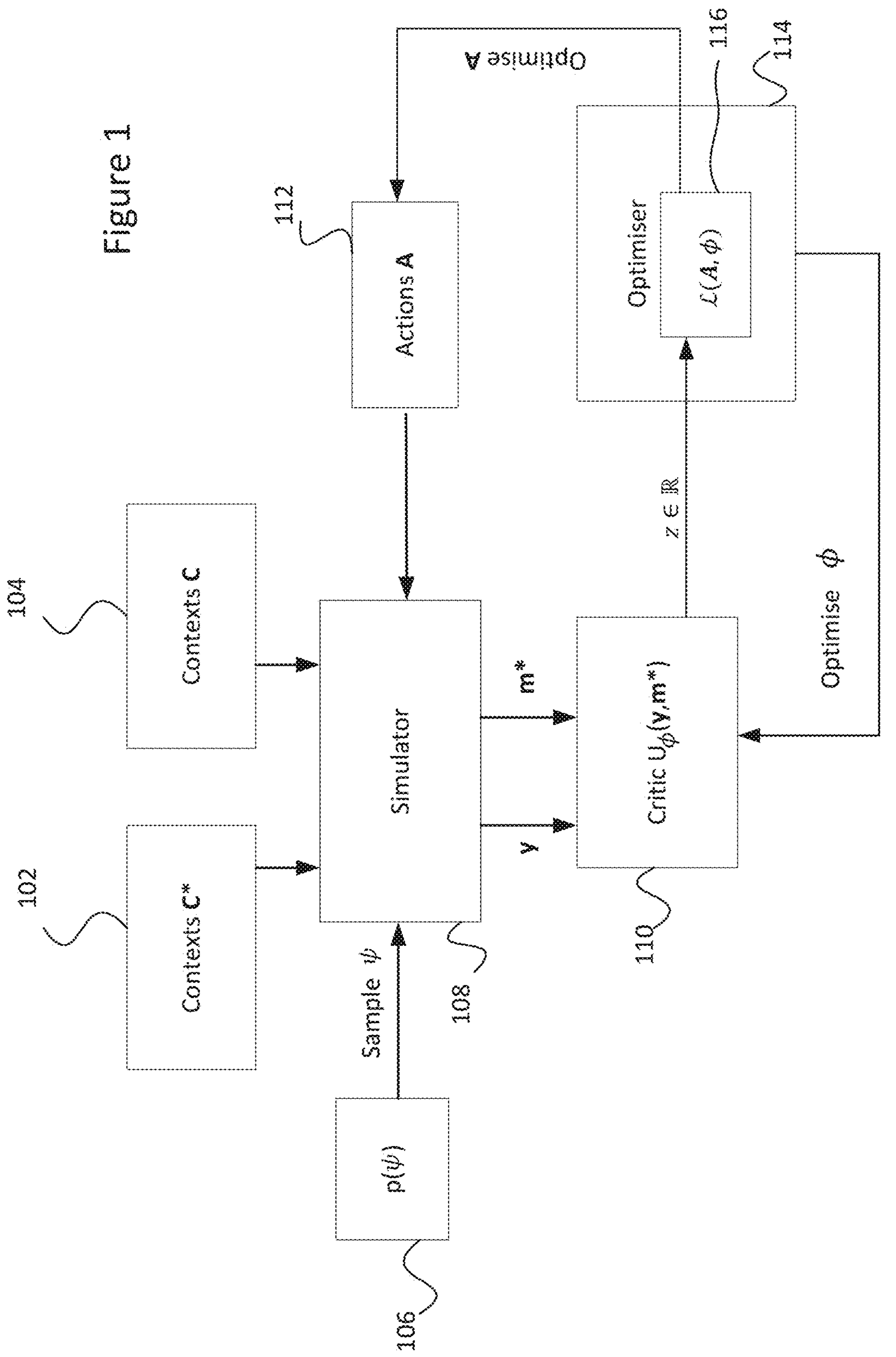
FIG. 1 shows a schematic diagram of a Bayesian experimental design method.

Any of the above figures may be combined into a single example or embodiment.

DETAILED DESCRIPTION

Herein, a systematic and generally applicable machine learning algorithm for real-world experiment design is provided that increases experiment efficiency, in the sense of increasing the information gain from a given number of experiments performed on a given number of physical entities. The algorithm can be used in many contexts to design and perform real-world experiment on physical entities that are efficient in this sense. The method can be implemented in or applied to many different applications in a variety of fields utilizing real-world experiments on physical entities.

The real-world testing of decisions made using causal machine learning models is an important prerequisite for their successful application. The described embodiments focus on evaluating contextual treatment assignment decisions: these are personalised actions applied to entities, each with their own contextual information, with the aim of maximising a reward. A model-agnostic framework is used for gathering data to evaluate and improve contextual causal decision making through Bayesian Experimental Design (BED). Specifically, the method described herein is used for data-efficient evaluation of regret associated with some actions. Unlike standard approaches, such as A/B testing, this method simultaneously avoids assigning treatments that are known to be very sub-optimal and selects ones that can help improve the model. This is achieved by introducing a suitable contextual information-based objective, which is optimised end-to-end. The method applies to discrete and continuous treatments. Comparing this information-theoretic approach to baselines in several simulation studies demonstrates the efficiency and the superior performance of the approach described herein.

Machine learning models, particularly causal machine learning models, can be used to make real world decisions. The described embodiments use causal models to determine the best action to each apply to each member of a context set (i.e. each entity of a given problem). Rather than using a model directly to make important decisions, it is sensible to test the model by obtaining new, interventional data from an experiment that can help to evaluate and improve the model. In fact, the two requirements are actually two sides of the same coin—in order to correctly evaluate the outcomes of an existing treatment assignment policy, it is required to improve the accuracy of estimates of the best achievable outcome for each member of the context set. The embodiments described herein consider the goal of collecting experimental data to evaluate such models and improve decisions made in future.

To formalise the aforementioned goal, the contextual optimisation problem is considered, in which a treatment or treatments must be assigned to each context to receive an outcome. Since treatment is an intervention, a model of the interventional distribution is required, making causal-aware models a common choice. Rather than seeking the treatments with the best rewards, the methods described herein are focussed on the experimental design problem of finding treatments that allow the evaluation of the regret of past actions and to improve decisions made in the future. The aim is to choose actions to test the model, rewards are not directly optimised in the experimental phase. The described methods focus on model testing by evaluating the regret of some past treatments—in the real world, regret is not known because the best achievable outcomes are unknown. The problem of collecting data (exploration phase) to obtain better rewards in later interactions (exploitation phase) is also considered. In line with the real-world scenario, the described methods are focused on design of large batch experiments.

An experiment having different possible actions that can be applied to a plurality of experiment entities (referred to as a set below, where the set contains at least two entities) can be designed in a more principled way by turning to the framework of Bayesian experimental design. The objective function of an experimental design can be defined as the expected information that is gained about the maximum value obtainable for each context point (entity). Whilst existing methods generally use a fixed Bayesian model such as a Gaussian Process to solve problems of this form, herein a completely model-agnostic framework is presented that frames this problem as one of implicit likelihood Bayesian experimental design. The advantage of this approach is that any simulator model (as long as it satisfies certain requirements) can be used as the underlying model for the given system on which the experiments are to be carried out.

The method described herein extends approaches from Bayesian optimisation to the case of contextual optimisation (i.e. where each entity has its own context and different actions can be applied to each entity), without limiting the Bayesian model to only Gaussian processes. This method uses an information-theoretic approach to determine a best action (treatment) for each experiment entity, by optimising an estimated measure of mutual information which uses noise contrastive estimation based on simulated experiment outcomes and test rewards. The method is highly flexible in that it can be applied to various Bayesian models, and not solely to Gaussian processes, and furthermore can be implemented for both continuous and discrete actions (treatments).

The method described herein also differs from existing contextual bandit methods in that it is focused on information-theoretic rules that can be applied to a range of simulators, as well as being focused on large-batch acquisition. Furthermore, the present methods support both continuous and discrete treatments, and consider Bayesian models with non-trivial causal graphs.

Aspects of the disclosure improve the functioning of a computing device at least by selecting treatments for experiment based on an expected information gain about the rewards available when those treatments are applied to test contexts. This enables an informative set of experiments to be performed, that consumes fewer processing resources than traditional approaches to experiment, such as random treatment assignment, by running fewer experiments overall. Since fewer experiments are run, fewer experimental results (determined by applying experiment treatments to real-life entities) need to be processed to determine a treatment to be applied to the set of test entities.

The information-theoretic approach described herein enables experiments to be carried out more efficiently, since the experimental design is performed so as to maximise the information gained about 'test' contexts during experiments. In contrast to random assignment experiments (e.g. A/B testing in the binary case), the selection of treatments in the experiment phase is directed to treatments that are informative about the 'best' rewards for a given test context. This improves both the resources required for running experiments before determining an optimal final treatment to apply to the test contexts, as well as enabling improved treatments to be determined by avoiding known sub-optimal treatments in experiment. Note that 'test contexts' as used herein refers to the contexts to which a set of treatments are applied after the experiment phase is completed. For example, in a manufacturing use case, the test context may be a manufacturing apparatus for which a treatment is a set of manufacturing settings which are applied to manufacture real products.

FIG. 1 shows a schematic block diagram of a method of experimental design using Bayesian optimisation. The goal of this method is to find a substantially optimal set of experiment actions, A, (the 'experiment' or 'treatment') to be applied to an 'experiment set', given the following:

- a set of at least two experiment contexts C (104), each of which is a feature (attribute), or a set of features for an entity (the entity's 'context') of the experiment set;
- a set of at least test contexts C*, defining a feature or set of features for each entity of a test set.

In the following description, the notation $y_k$ denotes a predicted outcome of applying an action $a_k$ (action parameter) to a kth entity of the experiment set with individual context $c_k$. The notation $y=\{y_k\}$ denotes a predicted set of outcomes obtained by applying a set of actions to an experiment set.

The notation $m^*_k$ denotes a predicted quantity for a kth entity of a test set with individual context $c^*k_k$. The notation $m^*=\{m^*_k\}$ denotes a predicted set of quantities obtained from a test set.

The 'k' subscript is omitted for conciseness where the meaning is clear from the context.

The expected regret of performing an action a* in a context of interest c* is a function of the best obtainable outcome m(c*) for a context c* and the expected value of an outcome y given the action a* and context c*. In some examples, this is represented as:

$$R(a^*,c^*)=m(c^*)-\mathbb{E}[y|a^*,c^*], \tag{1}$$

where $$m(c^*)=\max_a \mathbb{E}[y|a^*,c^*]$$

is the obtainable outcome for context c*. The primary obstacle to evaluating the regret in the real world is that m(c*) is not known. A goal of the methods described below is to obtain experimental data from possibly different contexts that will help to efficiently infer it, which will in turn lead to choosing better treatments in future.

In the examples below, the outcome y is a predicted reward, and the quantity m* of interest is a maximum obtainable reward.

The experiment is performed on the experiment set to obtain a set of experiment results. The aim is to design the experiment in a way that maximizes the usefulness of the experimental results in making subsequent predictions about the test set. The method uses a systematic Bayesian optimization approach.

Bayesian Experimental Design (BED) is a principled information-theoretic framework for designing optimal experiments to learn about model parameters θ. Starting with a prior p(θ) and observation likelihood given parameters and designs p(y|θ, ξ), the optimal design is the one maximising the expected information gain, also equivalent to the mutual information between θ and y. Mutual information is a function measuring the information shared between random variables θ and y by computing an expected value of a logarithm of the ratio between two probability distributions p(y|θ, ξ), p(y|ξ), In some examples the mutual information can be written as:

$$I(\xi) = \mathbb{E}_{p(\theta)p(y|\theta,\xi)}\left[\log\frac{p(y|\theta,\xi)}{p(y|\xi)}\right].$$

The described method is 'contextual', in that each entity of the experiment set and test set is characterized by its own context (feature or set of features), and an optimal action (or actions) is determined individually for each entity of the experiment set based on its individual context. That is to say, an action or actions are customized for a given entity taking into account the entity's individual context (as opposed to e.g., determining one action or a set of actions applied uniformly to all entities). This implies that different actions may be taken for entities with different contexts (in other words, the method is flexible enough to allow different actions to be assigned to different entities in the experimental design phase when those entities have different contexts).

The described method uses gradient-based optimisation (e.g. backpropagation) applied to a differentiable loss function (training loss), in contrast to gradient-free or derivative-free optimization techniques that perform function optimization without using analytical gradient information.

The loss function is defined from an information-theoretic perspective, so as to maximize predicted information gain between the experimental results (e.g. rewards obtained in performing the actions) and quantities of interest pertaining to the test set (e.g. maximum obtainable rewards).

The loss function may be said to encode a predicted information gain between the predicted experiment outcome associated with each physical experiment entity and the predicted test quantity associated with each physical test entity. This is not limited to an information gain between individual experiment outcomes y associated with a set of experiment entities and individual test quantities m* associated with a set of physical test entities; it also includes measures that evaluate an information gain between a plurality of predicted experiment outcomes associated with a plurality of physical experiment entities and a plurality of test quantities associated with a plurality of physical test entities. For example, applying the InfoNCE measure described below and defined in Equation 4, many experiment outcomes are sampled for each physical experiment entity, and many test quantities are sampled for each physical test entity, with an overall information gain being an expectation approximated over all samples.

To make the gradient-based optimization computationally tractable, the loss function approximates the information gain using a differentiable and training machine learning (ML) context function, such as a neural network, parameterized by a critic parameter ϕ. The loss function is jointly optimized with respect to the set of experiment actions and the critic parameter ϕ. Note that a critic parameter may be non-scalar, and possibly high-dimensional, e.g. the critic parameter could be a set of neural network weights.

In general, the true interventional distribution p (y|a, c) is not known. A Bayesian parameter ψ that describes different possible joint distributions can be introduced. By sampling different realisations of ψ, a Bayesian uncertainty can be computed in possible outcomes y for different contexts c and different actions a, as well as possible values of m(c*).

Figure 5:
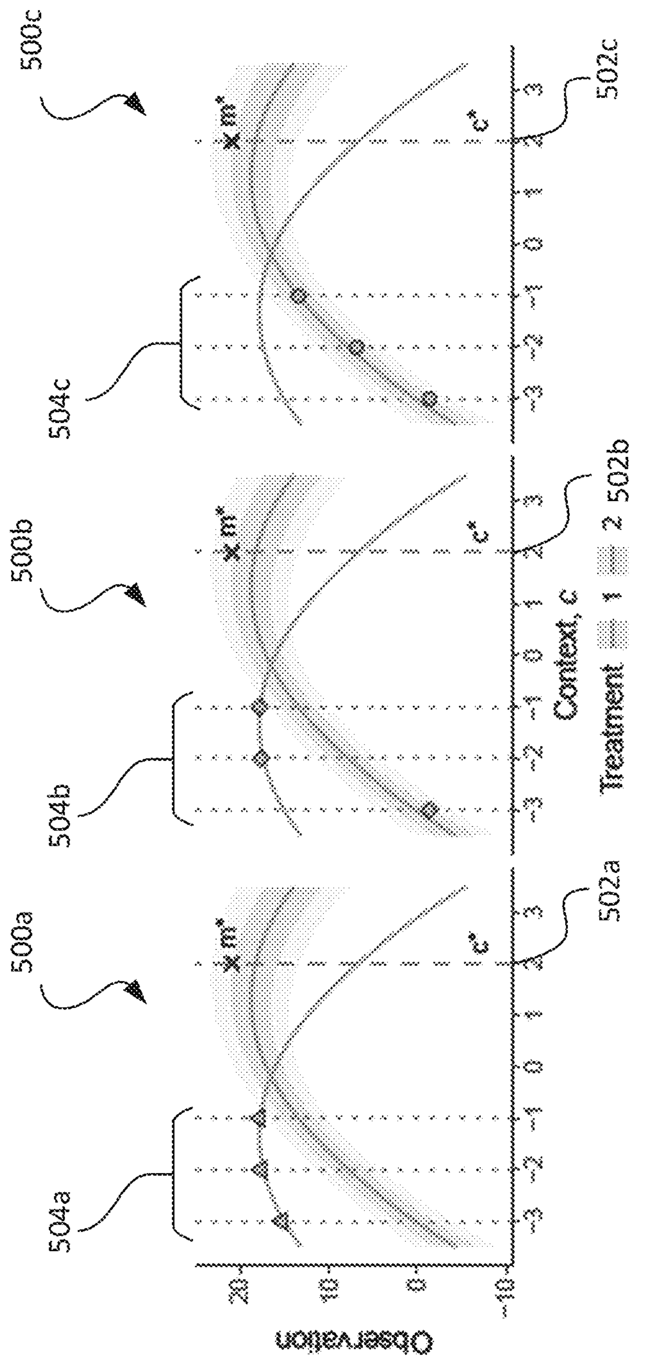
FIG. 5 shows a stylised example of the set up and mechanics of different experimental design methods.
Figure 6:
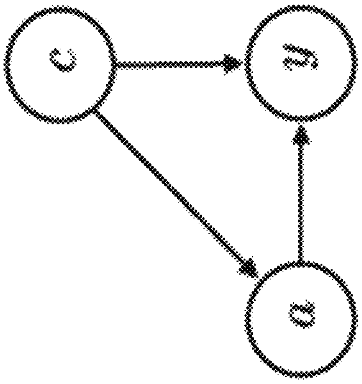
FIG. 6 shows a graph representation of the assumed relationship between outcomes, contexts and treatments.

FIG. 5 shows a stylised example of a binary treatment case, assuming the outcomes y are caused by the context c and treatments a, as illustrated by the graph of FIG. 6. Given a realisation of ψ, the reward is $y=f_\psi(a, c)$—a simple deterministic quadratic function of c and a; similarly, given ψ, the max-value m(c*) is a deterministic function of c*. The goal of each experimental design method is to estimate m*—the maximum achievable reward in context c*, denoted by a dashed line 502*a*, 502*b*, 502*c*. To do this, a batch of three experiments in contexts $c_1$, $c_2$, $c_3$, denoted by dashed lines 504*a*, 504*b*, 504*c* can be performed. FIG. 5 shows a plot of the observations for each of an upper confidence bound method (500*a*), a random testing method (A/B testing in this case, since the treatments are binary) (500*b*), and the Bayesian experimental design method described herein (500*c*).

A "simulator" refers to a Bayesian model of a joint probability distribution over the set of predicted outcomes y and the set of predicted quantities m* that is parameterized by ψ (a world parameter or set of world parameters). Different world models are obtained by sampling different values of ψ. The joint probability distribution is conditional (in the Bayesian sense) on the world parameter(s) ψ, a given a set of experiment actions A, a given set of experiment contexts C, and a given a set of test contexts C*. The described method is generally applicable, in that it can be applied with any parameterized model of this joint distribution.

Note that an "action" a performed on one entity can be a single real-world action (e.g. represented by a scalar action parameter) or a particular combination of real-world actions (e.g. represented by a vector or other non-scalar action parameter).

In the following description, the terms "value" and "parameter" are used, noting values/parameters could be scalar or non-scalar (e.g. vector). Thus, a value/parameter can refer to a single scalar value/parameter or a set of scalar values/parameters.

The method can be applied to different types of real-world actions performed of different types of physical entities. Various example contexts are described herein.

As shown in FIG. 1, a set of experiment contexts 104 (C) and a set of test contexts 102 (C*) are provided to a simulator 108. A set of actions A (112) to be applied to the experiment entities is initialised, for example using random initialisation, with the eventual goal of learning an optimal set of values for A (defining a set of optimal experiment actions in the above sense). Actions are defined for each entity and actions can be discrete or continuous. The simulator 108 is a parameterized model that computes a probability of obtaining the set of outcomes y (e.g. rewards) on the experiment set and the set of quantities m* (e.g. maximum possible rewards) on the test set given the experiment contexts C, the test contexts C*, the set of actions A and the world state ψ. The simulator 108 has the form of a computer program or set of computer programs that consumes, as input, a world parameter (or set of parameters) ψ (the 'world state' or 'world realisation'), a set of experiment contexts C, a set of test contexts C* and a set of experiment actions A, and computes therefrom a joint probability distribution over observations y and predicted quantities m* of the form $$p(y,m^*|C,C^*,A,\psi).$$

The simulator model 108 can be defined according to the given problem, and examples of possible Bayesian models are described further herein.

The state of the world is unknown. Therefore, a world parameter distribution p (ψ) (106) is defined, from which different world states ψ can be sampled (as different values of the parameter ψ). A sampled world state forms part of the input to the simulator model 108.

The simulator 108 is executed multiple times for a given (C, C*, A) with different possible world states ψ sampled from the world parameter distribution 106. Each world state ψ provides a different joint probability distribution for a given (C, C*, A). The simulator 108 encodes assumed relationships between the world state ψ and the probable outcomes of actions on entities taking into account their contexts.

Having sampled a world state to obtain a joint probability distribution, p(y, m*|C, C*, A, ψ), a set of possible experiment outcomes y and a set of possible test quantities m* are sampled from that joint distribution. In some implementations, y and m* may be sampled independently from separate distributions p (y|A, C, ψ) and p(m*|C*, ψ), but this is not a requirement. In some embodiments, given a realization of ψ, each $y_i$ and $m^*_j$ may be sampled as $y_i \sim p(y_i|a_i, c_i, \psi)$ and $m^*_j \sim p(m^*_j|c^*_j, \psi)$, allowing each entity to be considered individually (note, this assumes a given realization of the world state ψ; in general, the joint distribution for an unknown world state, p(y, m*|C, C*, A), cannot be decomposed in this way because (y, m*) are not generally independent if the state of the world is unknown). Note that the notation '$y_i$' here denotes a vector of outcomes $\{y_{i,k}\}$ for the set of entities k at a given sampling step i, and similarly $m^*_j$ denotes a vector of test quantities $\{m_{j,k}\}$ for the set of entities k at a given sampling step j.

The goal is to find the actions applied to the experiment entities that maximise the information gained about the maximum return m* on the test entities. To approximately maximise this quantity, a parameterized critic function $U_\phi$(110) is defined that outputs a real-valued scalar $z=U_\phi(y, m^*)$ for a given pair (y,m*)—that is, a given set of sampled outcomes y on the experiment set and a given set of sampled test quantities m* for the test set—and a given set of critic parameters ϕ. The critic function 110 may be implemented as a neural network or other machine learning (ML) model that is trainable via gradient-based optimization. Alternatively, the critic function may have a closed form, such that no training of critic parameters is necessary in order to arrive at an optimal critic.

For the trainable case, for example where the critic model is a neural network having a set of neural network weights (parameters) ϕ, the critic model parameters ϕ and the set of experiment actions A are jointly optimised by an optimiser 114 that maximises a loss function 116 (training loss) defined with respect to the critic model 110 to approximate a the information gained about the maximum return on the test entities. An example mathematical form of the loss function is InfoNCE (where 'NCE' is noise contrastive estimation) defined below, which provides a lower bound on the information gain between experiment outcomes and the maximum test rewards m* associated with the given set of actions.

The critic model 110 is applied to each possible combination of (y, m*) from among the pairs generated by the simulator 108 to generate a set of real numbers from which the loss function can be estimated. The critic model 110 may be a trainable neural network with a set of network weights ϕ, where the optimisation of the actions a and parameters ϕ of the critic model 110 is implemented using gradient descent (or ascent), backpropagating gradients of the loss function $\mathcal{L}(A, \phi)$(116) through the network to determine updates for the weights ϕ and the actions a. The example loss function InfoNCE encourages the trainable critic model to learn to distinguish jointly sampled pairs (y, m*) generated in the same simulation iteration and therefore relating to the same world realisation from combinations of y,m* that are associated with different world realisations (this concept is known as noise contrastive estimation), while the actions are updated to maximise the InfoNCE which is used as an approximate measure of information gain.

In the non-trainable case, i.e. where an optimal critic model is known and applied directly, no critic parameter optimisation is performed. Instead the loss function directly represents a measure of information gain, and the optimisation comprises computing a gradient of the critic with respect to the actions A only, and updating the actions based on the computed gradients.

For a set of actions A taking discrete values, a Gumbel-Softmax relaxation is used in training to compute updates to the actions.

The updated actions are input to the simulator 108 to sample a new set of outputs in a next iteration of training, while the updated parameters ϕ are implemented in the critic model for the next iteration. The training process continues for a predetermined number of training sets, or until some predefined training condition is met. Once trained, the updated set of actions A is output as the optimal set of actions to take in the experimental phase, i.e. the set of actions corresponding to the optimal experimental design.

The above-described method can be used to solve a variety of real-world contextual optimisation problems. One example problem where the above method can be applied is the manufacture of a set of similar but distinct products, such as bespoke products. The manufacturer wishes to conduct experiments to identify the best manufacturing settings for each product. This can be performed in two stages: a first experiment phase, where data is collected, and a second phase where the data is used to decide which machine settings to use in the manufacture of the products. In this case, a physical entity has the form of a particular physical configuration of a machine. The above method can be used to design the experiment phase of this process, i.e. to determine manufacturing settings to apply in the experiment phase that lead to the data collected being as informative as possible about the manufacturing settings and their effects when used in the manufacture of the products. The experiment context set C for this example would be a set of attributes or features describing the products to be manufactured in the experiment phase of the process, while the test context set C* would be the attributes or features of the products used in the actual manufacture of the products. The actions or treatments A are the manufacturing settings, e.g. machine settings that can be used to manufacture products in the experiment phase in a way that is informative about the best manufacturing settings to use in the second phase.

Another application is clinical trials, where the method may be used to design a clinical trial on physical entities in the form of living beings (humans or animals) so that the trial is maximally useful.

The experimental design in the manufacturing example uses a predetermined simulator model to sample pairs of experiment outcomes y and test quantities m*, where an experiment outcome here represents some measure of reward or indication of the quality of the product manufacture according to the manufacturer's goals. For example, it may consider factors like time taken, cost to manufacture, and quality of the manufactured products. As described above, the experiment outcomes y and test quantities m* are sampled in dependence on different world realisations ψ. The critic model 110 processes each combination of y, m*, from the same and different world realisations, and both the parameters of the critic model and the set of experiment actions A to be taken in the experiment phase are updated to optimise a loss function that encourages the critic to discriminate between pairs $y_i$, $m^*_i$ associated with the same sampled world realisation $\psi_i$, and $y_i$, $m^*_j$ pairs where $y_i$ and $m^*_j$ are associated with different world realisations $\psi_i$, $\psi_j$. The updated actions A once training is complete can then be used to define the manufacturing settings used in the experiment phase.

Figure 2:
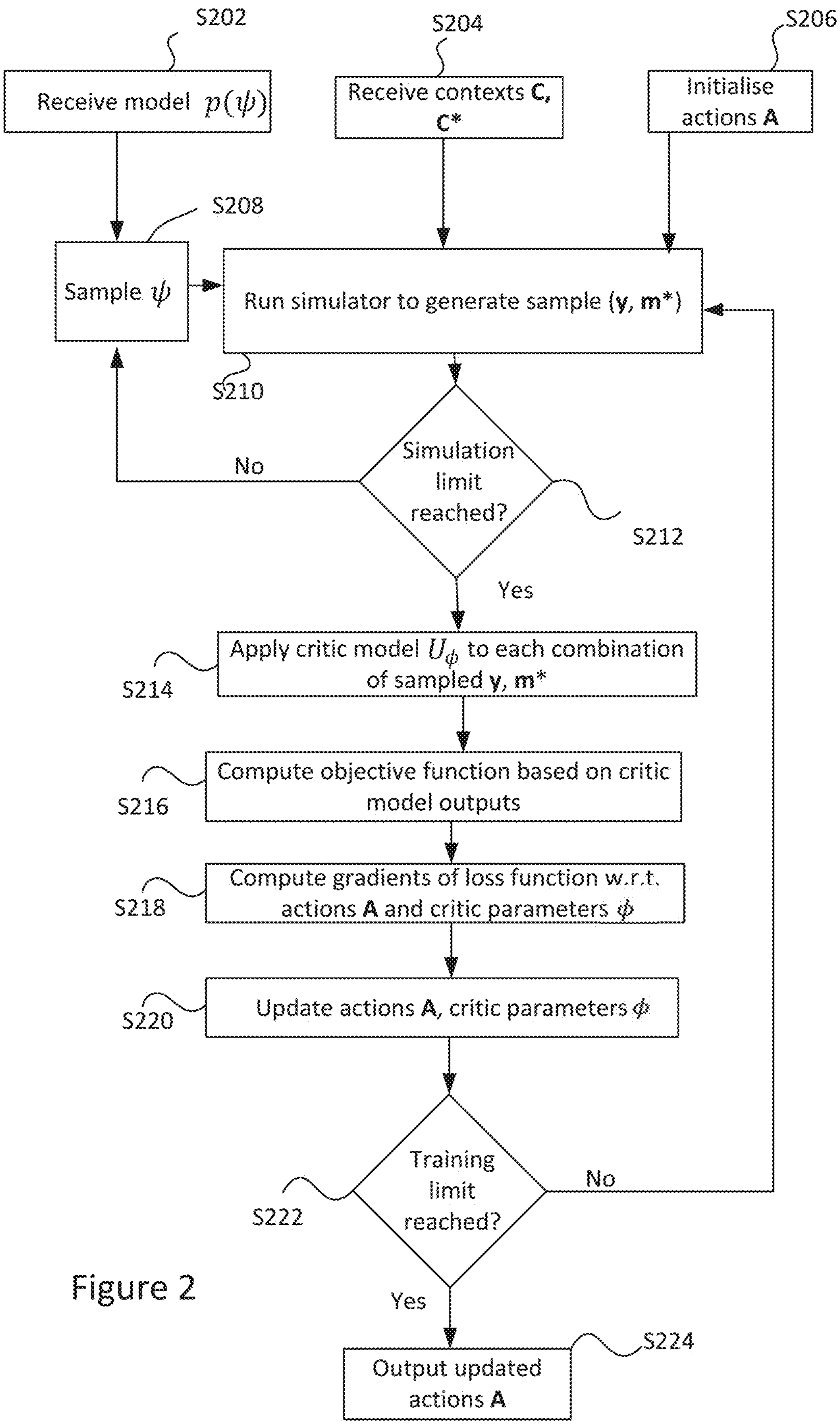
FIG. 2 is a flow chart showing the steps of an example experimental design method.

FIG. 2 shows a flow diagram of the steps taken to determine an optimal experiment design according to the method described above.

The method of FIG. 2 is summarized in pseudo code as follows, whilst Table 1 below relates the syntax used in the pseudocode to the mathematical notation used in the description:

```
Prerequisites:
  experiment_context / c_obs = set of entities to take part in experiment /
their individual contexts
  test_context / c_test = set of entities to evaluate performance on at the end
/ their individual contexts
  simulator model = a Bayesian model that allows joint samples to be taken
      p(ψ)p(y, m | c_obs, a_obs, c_test, ψ)
    where
      m(ψ, c) = max_a E [y | c, do(a), ψ]
    A sample from the model is (y_obs, m_test) where y_obs corresponds to
experiment_context and treatment, while m_test corresponds to test_context.
  critic = a function, e.g., neural network, from (y_obs, m_test) to scalar
  loss = e.g. InfoNCE loss function
Initialization:
  treatment = randomly initialise
  critic weights and biases randomly initialised
Training:
  For step in 1...num_steps:
    create a batch of independent samples from the model using treatment
    each element of the batch consists of (y_obs, m_test) that were sampled
jointly
    for each i in 1...batch_size
      for each j in 1...batch_size
        compute critic(y_obs^(i), m_test^(j))
    compute loss
    backpropagate loss to compute gradient of loss w.r.t. treatment, critic
    update treatment, critic using gradients
```

TABLE 1

| Pseudocode syntax | Mathematical notation | Explanation |
|---|---|---|
| c_obs | C | The set of contexts of the experiment set: $C = \{c_1, c_2, c_3, \ldots\}$ where $c_k$ is the individual context of entity k of the experiment set. |
| c_test | C* | The set of contexts of the test set: $C^* = \{c_1^*, c_2^*, c_3^*, \ldots\}$ where $c_k^*$ is the individual context of entity k of the test set. |
| a_obs | a | A set of actions that could be performed on the experiment set: $A = \{a_1, a_2, a_3, \ldots\}$ where $a_k$ is the action performed on entity k of the experiment set. |
| y | y | A set of possible experiment outcomes (e.g., rewards) $y = \{y_1, y_2, y_3, \ldots\}$ of performing some set of actions on the experiment entities; $y_k$ is the outcome for entity k of the test set. |
| m | m* | A set of possible test quantities (e.g. maximum rewards) $m^* = \{m_1^*, m_2^*, m_3^*, \ldots\}$ for the test set, where $m_k^*$ is the quantity for entity k of the test set. |
| (y_obs, m_test) | $(y, m^*) \sim p(y, m^* \mid C, C^*, A, \psi)$, | A set of experiment outcomes and test quantities sampled from the joint probability distribution computed by the simulator 108. |

For a given world state (realization of ψ), one set of experiment outcomes and one set of test outcomes is sampled in the above algorithm. For the case i=j, the critic is applied to experiment observations and test quantities corresponding to the same realization of the world (the same value of ψ). For the case that i is not equal to j, the critic is comparing observations and outcomes corresponding to different world states. The loss is a contrastive loss, such that the critic learns to distinguish between observations and test outcomes belonging to the same world state, and observations and outcomes belonging to different world states. That is, the critic learns to distinguish between samples belonging to the same realization of the world, and samples belonging to different world realizations, simultaneously with optimizing the experiment actions.

Referring to FIG. 2, at step S202, the distribution p(ψ) is received. As mentioned above, various possible distributions can be used, where the model is defined according to the given problem. The experiment context C and test context C* are received at step S204.

The set of actions A are initialised at step S206. The actions A may, for example, be initialised to random values. The contexts and actions are provided to the simulator. Once the model p(ψ) is received, this is sampled at step S208 and provided to the simulator. At step S210, the simulator 108 is configured to generate a sample comprising a set of experiment outcomes y and a set of test quantities m* for the action A. In the following, $\psi_i$ denotes a particular realization (value) of the ψ, and $y_i$, $m^*_i$ denote samples based on $\psi_i$. Note that, while the initialisation steps S204, S206 and S208 can occur in any order, or simultaneously, all three steps must be complete before the simulator is run at step S201.

At step S212, a check is performed to determine if a simulation limit has been reached. The limit may, for example, be a predetermined number of samples. If the simulation limit has not yet been reached, step S208 is repeated and a new ψ is sampled and the simulator is re-run at step S210 to generate a new sampled pair (y,m*). This is repeated until the limit is reached, i.e. until enough samples have been gathered for the next step. Note, although shown sequentially, the multiple sampling S208 and simulation steps S201 may be performed in parallel.

At step S214, the critic model 110 is applied to each combination of the sampled y and m*, i.e. for $y_i \in \{y_{i,1}, \ldots, y_{i,N}\}$ and $m_j \in \{m_{j,1}, \ldots, m_{j,N}\}$, where $y_{i,k}$ and $m^*_{j,l}$ denote, respectively, a sampled observation for experiment entity k and world state $\psi_i$ and a sampled test outcome for test entity l and world state $\psi_j$. As mentioned above, the critic model 110 outputs a real number for each input pair ($y_i$, $m^*_j$), providing a set of sampled outputs based on which the model parameters and actions can be optimised.

At step S216, the loss function 116 is estimated based on the sampled outputs of the critic model 110. At step S218, the gradients of the loss function are computed with respect to each of the critic model parameters ϕ and set of actions A. This computation may be implemented using auto-differentiation software. The actions and critic model parameters ϕ are then updated based on the computed gradients at step S220.

Steps S208-S220 constitute a single training iteration (training step). An initial training iteration is performed on the initial (e.g. randomized) contexts C,C* and actions A determined at steps S204-S206.

At step S222 it is determined whether a training limit has been reached. This may be when a certain number of training steps (iterations) have been completed, or some other termination (e.g. convergence) condition is satisfied. If the limit has not been reached, the simulation cycle of steps S208 and S210 are repeated with the updated actions A, and steps S214-S220 are repeated with updated critic model parameters ϕ as part of another training step, with this process being repeated until the training limit has been reached (S222). Once the training limit is reached, the final set of actions A are output as the estimated optimal experimental design.

Figure 3:
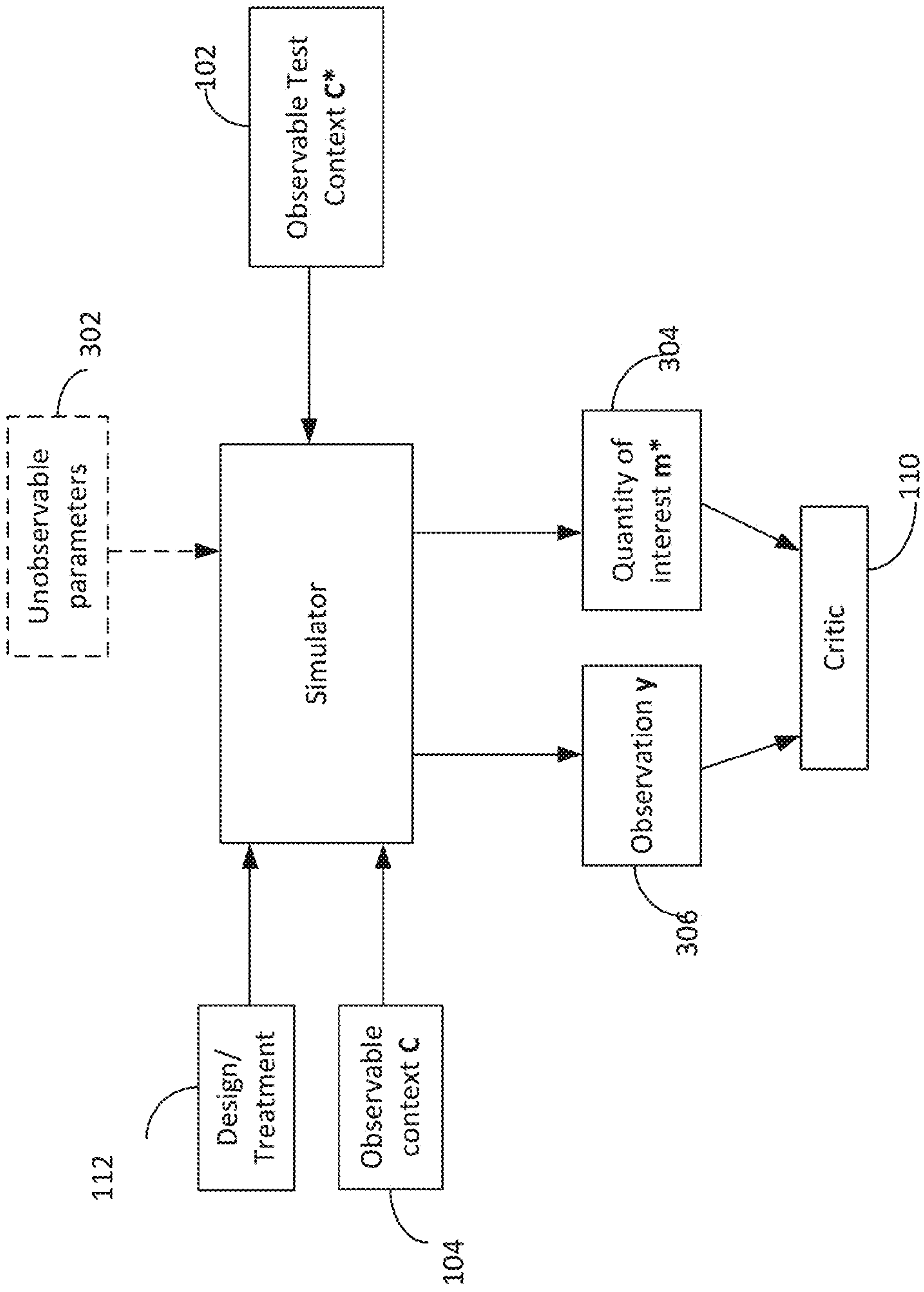
FIG. 3 shows a schematic block diagram of an example Bayesian experimental design method.

FIG. 3 is a high-level block diagram of the method described above with reference to FIGS. 1 and 2. The simulator 108 takes as inputs unobservable parameters (i.e. the parameters ψ of different world realisations sampled from the model p(ψ)), observable context C (i.e. the experiment context set 104), observable test context C* (i.e. the test context set), and the design/treatment 112 (i.e. set of actions A). The simulator function takes the parameters (which are fixed but unknown), contexts (which are given) and actions (which can be selected by a user) and returns a set of observations y and quantities m* of interest (e.g. the maximum possible reward for the given test context). These observations and quantities represent some properties of the phenomenon being modelled. Each run of the simulator samples a new world realisation, such that each generated pair of experiment observations 306 and test quantities 304 are sampled conditional on a respective world realisation. The critic model ($U_\Phi$) 110 processes these samples from the simulator, namely observations and quantities, to return a real-valued scalar.

The critic is constructed in a way that it forms a lower bound on the expected information gain between observations and quantities of interest (InfoNCE lower bound), and the critic model can be optimised to make this lower bound as tight as possible (i.e. as close as possible to the actual information gain) for a given class of functions. The critic acts as a feedback loop for choosing better designs. Thus, the critic and the design are optimised jointly in order to estimate the information gained about the quantity of interest and choose the optimal design to maximise that information. The InfoNCE lower bound is a contrastive measure which when optimised encourages the critic model to distinguish pairs (y, m*) associated with the same world realisation ψ from combinations y, m* associated with different world realisations ψ. Where the critic is a trainable model such as a neural network, InfoNCE is used as a loss function $\mathcal{L}$, and a set of gradients of the loss function $\mathcal{L}$ are computed with respect to the parameters ϕ of the critic model and with respect to the actions A, with the critic parameters and the actions being updated based on the computed gradients as shown by the arrow directed to the design/treatment 112 in FIG. 3.

The design/treatment 112 (i.e. an updated set of actions) is chosen in a way that is most informative about the quantity of interest associated with the test context.

Figure 4:
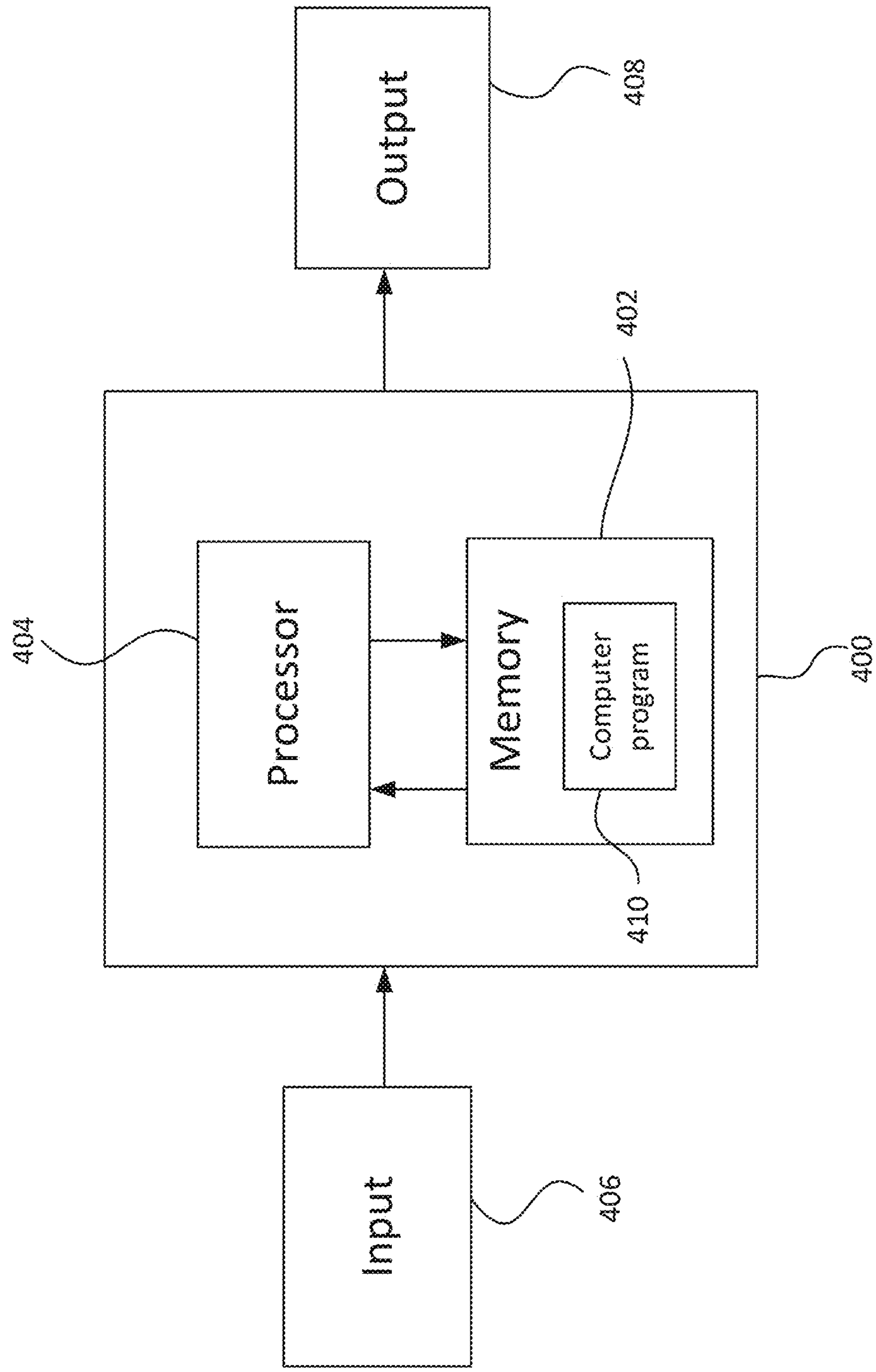
FIG. 4 shows a computer system for implementing an example experimental design method.

FIG. 4 is a schematic block diagram of an example computer system on which the method describe above can be implemented. The computer 400 comprises memory 402 and a CPU 404. A computer program 410 to implement the above-described method is stored on the memory and the executable instructions of this program are read from the memory 402 and executed by the processor 404. The inputs 406 to the computer system could include, for example, the simulation model 108, the experiment and test contexts C, C*, an initial set of experiment actions A, the critic model 110 including any initial critic parameters and a model of the world state p(ψ). These may be input, for example by a user via a user interface, or alternatively these may be held in an external memory device, or other computer system, and output to the computer system 400. The computer system 400 receives the inputs and processes the data by executing the computer program 410 which implements the algorithm described herein to iteratively update the experiment actions A.

Once an optimal set of actions A are determined, this set is provided as an output 408 of the computer system. The output may be provided to a user via a user interface such that the user can configure the real-world physical system to implement the given actions. Alternatively, the actions may be output provided directly to a computer system or other type of controller that can implement the actions in the real-world system. For example, in the manufacturing example described above, the optimal actions may be output to a computer system that controls the settings of the machines so as to implement the experiment settings that have been determined as optimal in an experiment phase. The output 408 may, for example, take the form of a human-readable design specification. In generating the design specification, computer-readable output(s) (e.g. the final value(s) of the action parameter(s) as determined in the final training iteration) may be converted to a more user-friendly form (e.g. comprising natural language instructions and/or diagram(s) detailing the final experiment design).

A final set of actions A, as computer in the final training iteration, may be conveyed to a user via a suitable user interface, such as a graphical user interface rendered on a display device or devices, and/or via another form of output device or devices (in e.g., visual, audible and/or tactile form etc.). The final set of actions A may be converted to a more-readily human interpretable form for this purpose (such as a natural language description, diagrammatic form or any other human-interpretable form). The user (where the terminology includes a group of users or team) may then carry out the actions A in the real-world, in order to collect maximally-informative experimental results that can then be utilized. The output 408 can take any form such as an image or images rendered on a display (or displays) a generated file, such as a document, that may be rendered visually; or a non-visual output (e.g. audio output). An experiment design, more generally, refers to any form of data or information conveying an experiment action (or actions) and an experiment entity (or entities) in respect of which the experiment action(s) is/are to be performed. An experiment design may be said to be based on an action parameter, and in that case the experiment design may be directly or indirectly based on that action parameter. For example, an experiment design that is directly based on a final action parameter determined in a final training iteration is also indirectly based on any initial or intermediate action parameter(s) used in determining the final action parameter, and may therefore said to be based on any one or more of those initial, intermediate or final action parameters.

It will be understood that the computer system of FIG. 4 may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in non-transitory memory and executable by the processor, or by hardware, or by a combination of tangibly stored software and hardware (and tangibly stored firmware).

Some aspects of the embodiments described herein with reference to the drawings comprise computer processes performed in processing systems or processors. Some aspects also extend to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Reference is made herein to data storage for storing data. This may be provided by a single device or by plural devices. Suitable devices include for example a hard disk and non-volatile semiconductor memory (e.g. a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Preferred embodiments will now be described in further detail by way of example only.

The methods described herein consider a contextual optimisation problem with treatment a, reward y, and context c. The context c can be considered as the set of relevant but unchangeable attributes, and a can be considered as a set of actions that can be applied in each context c. The context c would be the information available about the entity that cannot be directly acted upon such as fixed attributes or historical observations, a would be set of actions that could be applied.

The goal of this method is to efficiently evaluate the regret of a causal decision making process, which translates to estimating the maximum achievable rewards in a set (or a batch) of D* test contexts $C^*=c^*_1, \ldots, c^*_{D^*}$. To this end, an assumption is made that a batch of D experiments can be performed in contexts $C=c_1, \ldots, c_D$. The experimental design problem is to select the treatments $A=a_1, \ldots, a_D$ to apply to C so that the experimental outcomes $y=y_1, \ldots, y_D$ are maximally informative about $m^*=m(c^*_1), \ldots, m(c^*_{D^*})$. More formally, A is designed to maximise expected information gain (EIG) between y and m* conditional on the contexts C and C*. As mentioned above, the expected information gain, or mutual information, is an expectation value of the log of a ratio between a joint probability distribution of two random variables and the individual probability distributions for each random variables. For the present example, the expected information gain can be written as:

$$\mathcal{J}(A; C, C^*) = \mathbb{E}_{p(y, m^*|C, C^*, do(A))}\left[\log\frac{p(y, m^*|C, C^*, do(A))}{p(y|C, do(A))p(m^*|C^*)}\right] \quad (2)$$

$$= \mathbb{E}_{p(\psi)p(y, m^*|C, C^*, do(A), \psi)}\left[\log\frac{p(y|m^*, do(A), C)}{p(y|do(A), C)}\right], \quad (3)$$

where $p(y|do(A), C) = \mathbb{E}_{p(\psi)}[p(y|do(A), C, \psi)]$, $p(m^*|C^*) = \mathbb{E}_{p(\psi)}[p(m^*|C^*, \psi)]$ and $p(y, m^*|C, C^*, do(A)) = \mathbb{E}_{p(\psi)}[p(m^*|C^*, \psi)p(y|C, do(A), \psi)]$.

The objective (3) is doubly intractable meaning that its optimization, or even evaluation for a fixed value of A, constitutes a major computational challenge. The problem is made harder by the fact that the likelihoods in the expression inside the expectation are implicit, i.e. not available analytically. Therefore, one typically relies on non-scalable gradient-free optimisation techniques, such as Bayesian optimisation.

The methods described herein focus on gradient-based approaches for contextual optimisation, where such methods have recently been developed for batch experimentation for parameter learning rather than contextual optimisation. As mentioned above, the InfoNCE bound can be adapted to contextual optimisation setting.

The InfoNCE bound is defined as follows:

For any critic function $U: \mathcal{Y}\times\mathbb{R}\rightarrow\mathbb{R}$ and number of contrastive samples L≥1, $\mathcal{L}$(A; C, C*, L)≤$\mathcal{J}$(A; C, C*), where $$\mathcal{L}(A, U; C, C^*, L) = \mathbb{E}_{p(\psi)p(y_0, m_0^*|do(A), C, C^*, \psi)p(m^*_{1:L}|\psi, C^*)}\left[\log\frac{\exp(U(y_0, m_0^*))}{\frac{1}{L+1}\sum_l \exp(U(y, m_l^*))}\right]. \quad (4)$$

The bound is tight for the optimal critic U*=p(y, $m^*_l$)=p(y|m*, do(A), C)+c(y) as L→∞, where c(y) is an arbitrary function depending only on the outcomes y.

As described above, the critic U can be represented by a neural network with trainable parameters ϕ. When the actions A are continuous a pathwise gradient estimator for $\nabla_{A,\phi}\mathcal{L}$ is readily available. In this case stochastic gradient ascent can be applied to optimise the objective (4).

Previous gradient-based Bayesian experimental design has focused on fully-differentiable models. As mentioned above, discrete designs can be handled according to the methods described herein by relaxing the problem and applying Gumbel-Softmax. Given K≥2 possible treatments, a (non-deterministic) policy π is learned with parameters α:

$$\pi_{d,i} = \frac{\exp((\log\alpha_{d,i} + g_{d,i})/\tau)}{\sum_{j=1}^{K}\exp((\log\alpha_{d,j} + g_{d,j})/\tau)}, \quad (5)$$

$i = 1, \ldots, K$ $g_{d,i} \sim \text{Gumbel}(0, 1).$

The parameters α and ϕ are optimised jointly with SGA. Once the policy is trained, the optimal design for experiment d in the batch is $a_d$=arg max($\pi_{d,1}$, . . . , $\pi_{d,K}$).

Once the objective is optimised, a batch of experiments A is performed to obtain real-world outcomes y, and p(ψ|$\mathcal{D}$), the posterior distribution of the Bayesian model given this observational data, is estimated. The updated model is used to estimate m*, which can then be used to calculate the regret (1) of a treatment assignment A* for the test contexts of interest C. Algorithm 1 below provides a description of the method. The training stage of Algorithm 1 is described in pseudocode above, with reference to the steps of FIG. 2.

Algorithm 1

Input: Bayesian simulator p(y, m*|do(a), c, c*, ψ), batch D of experimental contexts C, batch D* of test contexts C*, number of contrastive samples L ≥ 1
Output: Optimal treatments A for experimental contexts C
Training stage:
  while Computational training budget not exceeded do
    Sample ψ ~ p(ψ)
    Sample y ~ p(y|C, do(A), ψ) and m* ~ p(m*|C*, ψ)
    Compute $\mathcal{L}$(A, $U_\Phi$; L) (4) and update the parameters (A, Φ) using a SGA
  end
Deployment stage:
Run a batch of experiments A to obtain real-world observations y and estimate a posterior p(ψ|$\mathcal{D}$), $\mathcal{D}$ = {y, A, C}.
Use the updated model to get an estimate of m* and evaluate the regret(1) associated with a some treatment assignment A* in contexts C*.

Figure 7A:
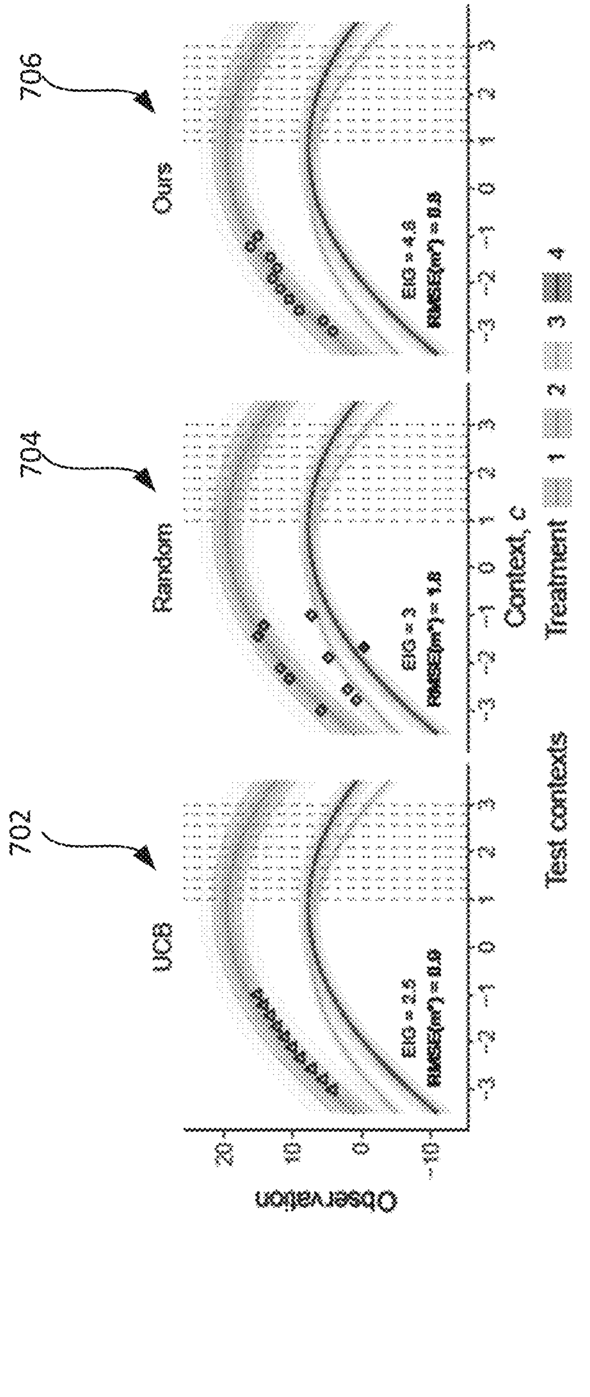
FIG. 7A shows an example evaluation of different design methods.

FIG. 7A provides an example evaluation of different experimental design methods for a set of possible treatments. In comparison with an upper confidence bound (UCB) method, shown in plot 702, and a random method, shown in plot 704, it is shown that the observations generated by applying Bayesian experimental design method described herein, shown in plot 706, are associated with the highest expected information gain, thus providing the most information about the best obtainable outcome m* for a given test context c*.

Figure 7B:
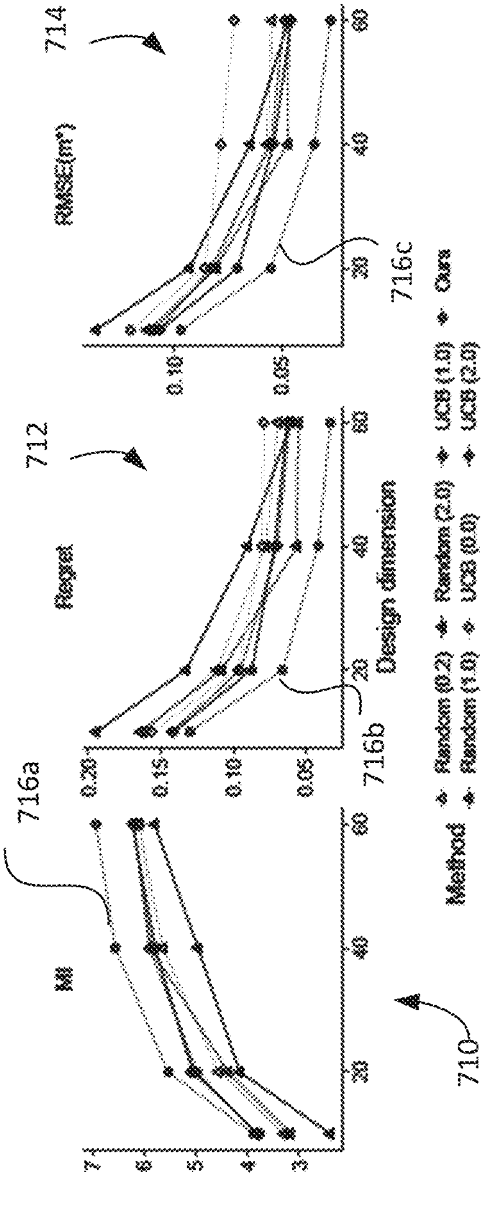
FIG. 7B shows results for different experimental design methods.

FIG. 7B shows a plot of mutual information 710, a plot of regret 712 and a plot of root mean square error (RMSE) of m* 714 for each of a set of experimental design methods. The Bayesian experimental design method described herein is shown to have the highest mutual information (716*a*), and lowest regret (716*b*) and root mean square error (716*c*) compared to the random and UCB methods, with the effect being greater for experimental designs of higher dimension.

An example implementation of the method of FIG. 2 will now be described. The following description uses pseudo-code elements to describe certain software components of the implementation.

A Bayesian model class is provided, which describes the most describes the most general Bayesian model that the method can operate on. The model itself could be, e.g., provided or indicated by a user. Different models may be used. The Bayesian model class implements a 'sample joint' method.

Class BayesianContextTreatmentModel:

Bayesian parameters are denoted by ψ. A prior is placed on the Bayesian parameters ψ. The Bayesian parameters on which a prior p(ψ) is placed are denoted by ψ. The parameters ψ comprise a graph G and/or a quantity θ. The following notation is used ψ=(G, θ) are the <parameters> y=<effect_variable> a=<treatment> c=<context>

The sample joint method is denoted by:

```
def sample_joint (
    self, treatment, experiment_context, test_context
  ):
```

The sample joint method is performed by sampling from the following joint distribution:

$$p(\psi)p(y,m|c\_obs,a\_obs,c\_\text{test},\psi)$$

where $$m(\psi,c)=\max\_aE[y|c,do(a),\psi]$$

is the max reward at the test context.

The sample joint method takes the following arguments:

Args:

treatment: the proposed treatments for each individual in the experiment context experiment_context: the experiment context features. Should have the same length as treatment test_context: the context points at which to evaluate max rewards.

The sample joint returns the following:

Returns:

A tuple (observations, max_rewards)

For a parametric Bayesian model, the joint sampling may be implemented as follows:

sample parameters ψ sample observations at experiment_context given ψ, experiment_context and treatment sample max_rewards at test_context given ψ, test_context An implicit mutual information class is also defined:

Class ImplicitMutualInformation:

The experimental design method maximizes the mutual information between an outcome y and a quantity the experiment designer wishes to gain information about, denoted by θ, under a design a. Mathematically, this may be expressed as:

$$\begin{aligned} I(\theta; y \mid a) &= KL(p(y, \theta \mid a) \,\|\, p(y \mid a)p(\theta)) \\ &= E\_\{p(y, \theta \mid a)\}[\log(p(y, \theta \mid a)) - \log(p(\theta)p(y \mid a))] \\ &= E\_\{p(\theta)p(y \mid \theta, a)\}[\log(p(y \mid \theta, a)) - \log(p(y \mid a))], \end{aligned}$$

where $$p(y|a)=E\_\{p(\theta)\}[p(y|\theta,a)],$$

which is usually unavailable in closed form. To simplify the implementation, it may be appropriate to assumed that the distribution of the quantity of interest is independent of the design:

$$p(\theta|a)=p(\theta)$$

There are a number of ways to approximate I(θ; y|a). The present example implementation does not require the likelihood p(y|θ, a) being analytic, as this implementation uses samples from this distribution.

An initialization method may be defined as follows:

```
"""
def _init_(self, model, critic, batch_size):
   """
  Args:
    model: a model to produce joint samples.
    critic: a function taking y, θ and returning a number.
    batch size: number of samples to approximate the expectation.
   """
  self.model = model
  self.critic = critic
  self.batch_size = batch_size
```

As can be seen, the initialization method takes three arguments: a model that produces joint samples, a critic model, and a match size. To implement the critic model, a critic class is defined:

```
class Critic:
  def _init_(self, shape_x, shape_y):
    set up network weights with the correct shapes
  def forward(x, y):
    a neural network that maps from x, y to a scalar
  def joint_and_product_scores(batch_x, batch_y):
    joint_scores = [self.forward(x, y) for x, y in zip(batch_x,
batch_y)]
    product_scores = call self.forward on all the other combinations
    return joint_scores, product_scores
```

Model training utilizes an InfoNCE loss:

```
class InfoNCE(ImplicitMutualInformation):
  def loss(self, *args):
    batch_x, batch_y = [self.model.sample_joint(*args) for _ in
range(self.batch_size)]
    joint_scores, product_scores =
self.critic.joint_and_product_scores(batch_x, batch_y)
    joint_term = joint_scores.sum( ) / self.batch_size
    product_term = (joint_scores +
product_scores).logsumexp(dim=1).mean( )
    loss = product_term - joint_term
    return loss
```

A training function incorporating the InfoNCE loss may be defined as follows:

```
def train(self, num_steps_range, experiment_context, test_context):
  treatment = initialise at random
  for _ in num_steps_range:
    loss = self.loss(treatment, experiment_context, test_context)
    compute loss gradients with respect to treatment
    update treatment by taking a gradient step
  return treatment
```

Using the above components, an optimal experiment design may then be obtained as follows:

```
  experiment_context = set of entities to take part in experiment
  test_context = set of entities to evaluate performance on at the end
  model = BayesianContextTreatmentModel( )
  critic = Critic(experiment_context.shape, test_context.shape)
  loss = InfoNCE(model, critic, 128)
  optimal_treatment = loss.train(10000, experiment_context,
test_context)
```

This uses a batch size of 128, and a steps range of 100. These are purely illustrative, and different values may be used.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

A first aspect herein provides a computer-implemented method comprising: receiving, for each physical experiment entity of a plurality of physical experiment entities, a context associated therewith that individually characterizes the physical experiment entity; receiving, for each physical test entity of a plurality of physical test entities, a context associated therewith that individually characterizes the physical test entity; computing, for each physical experiment entity, an initial value of an action parameter individually associated with the physical experiment entity; computing in each training iteration of a sequence of training iterations an updated value of the action parameter of each physical experiment entity, the sequence of training iterations including: an initial training iteration based on the initial value of the action parameter of each physical experiment, and a subsequent training iteration, based on the updated value of the action parameter of each physical experiment entity computed in the initial training iteration, each training iteration of the sequence of training iterations comprising: sampling for each physical experiment entity a predicted experiment outcome associated therewith and for each physical test entity a predicted test quantity associated therewith from a joint probability distribution based on: the context of each physical experiment entity, the context of each physical test entity, and the action parameter of each physical experiment entity, computing a numerical output using a critic function applied to the predicted experiment outcome associated with each physical experiment entity and the predicted test quantity associated with each physical test entity, and computing, using the numerical output, the updated value of the action parameter of each physical experiment entity based on a training loss that (i) is dependent on the critic function and the action parameter of each physical experiment entity, and (ii) encodes a predicted information gain between the predicted experiment outcome associated with each physical experiment entity and the predicted test quantity associated with each physical test entity.

The method may further comprise performing, on each physical experiment entity, a real-world experiment action defined by the updated value of the action parameter associated therewithin as computed in a final training iteration of the sequence of training iterations.

The method may comprise evaluating, by a computing device, a real-world test quantity associated with each physical test entity based on an outcome of performing the real-world experiment action on each physical experiment entity.

The sequence of training iterations may comprise a plurality of subsequent training iterations, each subsequent training iteration based on the updated value of the action parameter of each physical experiment entity computed in the previous training iteration.

The critic model may be parameterised by a critic parameter, the method further comprising: computing an initial value of the critic parameter, wherein the initial training iteration is based on the initial value of the critic parameter; wherein each training iteration of the sequence of training iterations comprises computing, via the gradient-based optimization, an updated value of the critic parameter, and each subsequent training iteration is based on the updated value of the critic parameter computed in the previous training iteration.

In each training iteration, the predicted experiment outcome associated with each physical experiment entity and the predicted test quantity associated with each physical experiment entity may be sampled based on a world state sampled from a world state distribution.

In each training iteration, multiple world states may be sampled from the world state distribution.

In each training iteration, a predicted experiment outcome may be sampled for each physical experiment entity and each world state and a predicted test quantity may be sampled for each world state.

The method may further comprise outputting, for each physical experiment entity, an indication of a real-world action, as defined by the updated value of the action parameter associated therewith as computed in a final training iteration of the sequence of training iterations.

The method may further comprise, based on performing the real-world experiment action on each physical experiment entity, determining for each physical test entity a real-world test action individually associated therewith.

The method may further comprise performing on each physical test entity the real-world test action individually associated therewith.

The predicted experiment outcome may comprise a predicted reward associated with the physical experiment entity, and the predicted test quantity may comprise a predicted maximum reward associated with the physical test entity.

The action parameter may be non-scalar.

The critic parameter may be non-scalar.

The critic parameter may comprise a neural network weight.

The method may be applied to determine a real-world experiment action to be performed on each physical experiment entity based on the updated value of the action parameter associated with the physical experiment entity.

A second aspect herein provides a computer system comprising: a memory embodying computer-readable instructions; and a processor coupled to the memory and configured to execute the computer-readable instructions, the computer-readable instructions configured to cause the processor to: receive, for each physical test entity of a plurality of physical test entities, a context associated therewith that individually characterizes the physical test entity; receive, for each physical experiment entity of a plurality of physical experiment entities, a context associated therewith that individually characterizes the physical experiment entity; determine, for each physical experiment entity, a first action parameter individually associated with the physical experiment entity; sample a first predicted experiment outcome associated with each physical experiment entity and a predicted test quantity associated with each physical test entity from a first joint probability distribution based on: the context of each physical experiment entity, the context of each physical test entity, and the first action parameter of each physical experiment entity; compute a first numerical output using a critic function applied to the first predicted experiment outcome associated with each physical experiment entity and the first predicted test quantity associated with each physical test entity; determine, for each physical experiment entity, a second action parameter individually associated with the physical experiment entity based on a training loss applied to the first numerical output computed using the critic function and the first action parameter of each physical experiment entity, the training loss applied to the first numerical output and the first action parameter encoding a predicted information gain between the first predicted experiment outcome associated with each physical experiment entity and the first predicted test quantity associated with each physical test entity; sample a second predicted experiment outcome associated with each physical experiment entity and a second predicted test quantity associated with each physical test entity from a second joint probability distribution based on: the context of each physical experiment entity, the context of each physical test entity, and the second action parameter of each physical experiment entity; compute a second numerical output using the critic function applied to the second predicted experiment outcome associated with each physical experiment entity and the second predicted test quantity associated with each physical test entity; determine, for each physical experiment entity, a third action parameter individually associated with the physical experiment entity based on the training loss applied to the second numerical output computed using the critic function and the second action parameter of each physical experiment entity, the training loss applied to the second numerical output and the second action parameter encoding a predicted information gain between the second predicted experiment outcome associated with each physical experiment entity and the second predicted test quantity associated with each physical test entity; output an experiment design based on the third action parameter. The computer-readable instructions may be configured to cause the at least one processor to: sample a third predicted experiment outcome associated with each physical experiment entity and a third predicted test quantity associated with each physical test entity from a third joint probability distribution based on: the context of each physical experiment entity, the context of each physical test entity, and the third action parameter of each physical experiment entity; compute a third numerical output using the critic function applied to the third predicted experiment outcome associated with each physical experiment entity and the third predicted test quantity associated with each physical test entity; and determine, for each physical experiment entity, a fourth action parameter individually associated with the physical experiment entity based on the training loss applied to the third numerical output computed using the critic function and the third action parameter of each physical experiment entity, the training loss applied to the third numerical output and the third action parameter encoding a predicted information gain between the third predicted experiment outcome associated with each physical experiment entity and the third predicted test quantity associated with each physical test entity; wherein the experiment design is based on the fourth action parameter.

The computer-readable instructions may be configured to cause the at least one processor to output the experiment design via a graphical user interface associated with the computer system.

The computer-readable instructions may be configured to cause the at least one processor to: compute a first critic parameter, wherein the first numerical output is computed using the critic function applied to the first predicted experiment outcome associated with each physical experiment entity, the first predicted test quantity associated with each physical test entity, and the first critic parameter; compute a second critic parameter based on the training loss applied to the first numerical output and the second action parameter of each physical experiment entity, wherein the second numerical output is computed using the critic function applied to the second predicted experiment outcome associated with each physical experiment entity, the second predicted test quantity associated with each physical test entity, and the second critic parameter.

A further aspect herein provides computer-readable storage media embodying computer-readable instructions configured, when executed on a computer processor, to cause the computer processor to carry out operations comprising: computing an initial value of a critic parameter; computing, for each physical experiment entity of a plurality of experimental entities, an initial value of an action parameter individually associated with the physical experiment entity; computing in each training iteration of a sequence of training iterations an updated value of the critic parameter and an updated value of the action parameter of each physical experiment entity, the sequence of training iterations including: an initial training iteration based on the initial value of the critic parameter and the initial value of the action parameter of each physical experiment, and a subsequent training iteration based on the updated value of the action parameter of each physical experiment entity computed in the initial training iteration, each training iteration of the sequence of training iterations comprising: sampling a plurality of predicted experiment outcomes associated with the plurality of physical experiment entities and a plurality of predicted test quantities associated with a plurality of physical test entities from a joint probability distribution based on: a context of each physical experiment entity, a context of each physical test entity, and the action parameter of each physical experiment entity, computing a numerical output using a critic function parameterised by the critic parameter and applied to the plurality of predicted experiment outcomes and the plurality of predicted test quantities, and computing, using the numerical output, the updated value of the critic parameter and the updated value of the action parameter of each physical experiment entity based on a training loss that is dependent on the critic function and the action parameter of each physical experiment entity, and encodes a predicted information gain between the plurality of predicted experiment outcomes and the plurality of predicted test quantities.

The invention claimed is:

1. A computer-implemented method comprising:

receiving, for a first physical experiment entity of a plurality of physical experiment entities, a first context that individually characterizes the first physical experiment entity;

receiving, for a first physical test entity of a plurality of physical test entities, a second context that individually characterizes the first physical test entity;

computing, for the first physical experiment entity, an initial value of an action parameter that is individually associated with the first physical experiment entity;

computing, in a sequence of training iterations, an updated value of the action parameter, the sequence comprising:

an initial training iteration based on the initial value of the action parameter, and a subsequent training iteration, for updating the action parameter, based on a value of the action parameter computed in a preceding training iteration of the sequence;

wherein a training iteration of the sequence comprises:

sampling, for the first physical experiment entity, a first predicted experiment outcome from a joint probability distribution, the first predicted experiment outcome being associated with the first physical experiment entity;

sampling, for the first physical test entity, a first predicted test quantity from the joint probability distribution, the first predicted test quantity being associated with the first physical test entity, wherein the joint probability distribution is based on the first context, the second context, and the action parameter, computing a numerical output using a critic function applied to the first predicted experiment outcome and the first predicted test quantity;

updating, using the numerical output, the action parameter based on a training loss that:

is dependent on the critic function and the action parameter, and encodes a predicted information gain between the first predicted experiment outcome and the first predicted test quantity;

outputting, for the first physical experiment entity, an indication of a first real-world experiment action, as defined by the updated value of the action parameter associated with the first physical experiment entity as computed in a final training iteration in the sequence of training iterations;

determining a real-world test action individually associated with the first physical test entity based on an outcome of the first real-world experiment action performed on the first physical experiment entity; and performing the real-world test action on the first physical test entity.

2. The computer-implemented method of claim 1 wherein the joint probability distribution comprises a Bayesian model of a joint probability distribution over predicted experiment outcomes and predicted test quantities, the Bayesian model being parameterised by a world parameter vector, such that different world models are obtained by sampling different values of the world parameter vector, the joint probability distribution being conditional on the world parameter vector, the action parameter of the first physical experiment entity, the first context, and the second context.

3. The computer-implemented method of claim 1, comprising evaluating a real-world test quantity associated with the first physical test entity based on an outcome of the performing of the first real-world experiment action on the first physical experiment entity.

4. The computer-implemented method of claim 1, wherein:

the critic function is parameterised by a critic parameter and the computer-implemented method includes computing an initial value of the critic parameter;

the initial training iteration is based on the initial value of the critic parameter; and the training iterations comprises computing, based on the training loss, an updated value of the action parameter, such that the critic parameter and the action parameter are jointly optimized across the sequence of training iterations.

5. The computer-implemented method of claim 4, wherein the critic parameter and the action parameter are jointly optimized across the sequence of training iterations via gradient-based optimization of the training loss.

6. The computer-implemented method of claim 5, wherein the sequence of training iterations is extended until a training limit, convergence threshold, or maximum number of iterations has been reached.

7. The computer-implemented method of claim 5, wherein at least one of the action parameter and the critic parameter is non-scalar.

8. The computer-implemented method of claim 5, wherein the critic parameter comprises a neural network weight.

9. The computer-implemented method of claim 1, wherein:

in the training iteration, a world state is sampled from a world-state distribution; and the first predicted experiment outcome associated with the first physical experiment entity and the first predicted test quantity are sampled based on the sampled world state.

10. The computer-implemented method of claim 9, wherein:

in the training iteration, multiple world states are sampled from the world-state distribution; and for the first physical experiment entity and for the first physical test entity, predicted experiment outcomes and predicted test quantities are sampled for the multiple world states.

11. The computer-implemented method of claim 1, further comprising:

receiving, for a second physical experiment entity of the plurality of physical experiment entities, a third context that individually characterizes the second physical experiment entity;

receiving, for a second physical test entity of the plurality of physical test entities, a fourth context that individually characterizes the second physical test entity;

computing, for the second physical experiment entity, an initial value of a second action parameter that is individually associated with the second physical experiment entity;

computing, in a second sequence of training iterations, an updated value of the second action parameter, the second sequence comprising:

an initial training iteration based on the initial value of the second action parameter, and a subsequent training iteration, for updating the second action parameter, based on a value of the second action parameter computed in a preceding training iteration of the second sequence;

wherein a training iteration of the second sequence comprises:

sampling, for the second physical experiment entity, a second predicted experiment outcome from the joint probability distribution, the second predicted experiment outcome being associated with the second physical experiment entity;

sampling, for the second physical test entity, a second predicted test quantity from the joint probability distribution, the second predicted test quantity being associated with the second physical test entity, wherein the joint probability distribution is based on the third context, the fourth context, and the second action parameter;

computing a second numerical output using the critic function applied to the second predicted experiment outcome and the second predicted test quantity; and updating, using the second numerical output, the second action parameter based on a second training loss that is dependent on the critic function and the second action parameter and that encodes a predicted information gain between the second predicted experiment outcome and the second predicted test quantity;

outputting, for the second physical experiment entity, an indication of a second real-world experiment action, as defined by the updated value of the second action parameter associated with the second physical experiment entity as computed in a final training iteration of the sequence of training iterations; and performing a second real-world test action individually associated with the second physical test entity on the second physical test entity, wherein the second real-world test action is based on the first and second real-world experiment actions performed on the first and second physical experiment entities, respectively.

12. The computer-implemented method of claim 1, wherein the method is used to design a clinical trial, and the first physical experiment entity and the first physical test entity are living beings.

13. The computer-implemented method of claim 1, wherein the first physical experiment entity and the first physical test entity are particular physical configurations of a machine.

14. The computer-implemented method of claim 1, wherein the first predicted experiment outcome comprises a predicted reward associated with the first physical experiment entity, and the first predicted test quantity comprises a predicted maximum reward associated with the first physical test entity.

15. The computer-implemented method of claim 1, further comprising: causing a control signal to be transmitted to an actuator or device configured to implement the first real-world experiment action.

16. A computer system comprising:

a memory embodying computer-readable instructions; and a processor coupled to the memory and configured to execute the computer-readable instructions, the computer-readable instructions configured to cause the processor to:

receive, for a physical test entity of a plurality of physical test entities, a first context that individually characterizes the physical test entity;

receive, for a physical experiment entity of a plurality of physical experiment entities, a second context that individually characterizes the physical experiment entity;

determine, for the physical experiment entity, a first action parameter that is individually associated with the physical experiment entity;

sample a first predicted experiment outcome associated with the physical experiment entity and a predicted test quantity associated with the physical test entity from a first joint probability distribution based on: the first context, the second context, and the first action parameter of the physical experiment entity; sample a first predicted experiment outcome associated with the physical experiment entity and a first predicted test quantity associated with the physical test entity from a first joint probability distribution based on: the first context, the second context, and the first action parameter of the physical experiment entity;

compute a first numerical output using a critic function applied to the first predicted experiment outcome associated with the physical experiment entity and the first predicted test quantity associated with the physical test entity;

determine, for the physical experiment entity, a second action parameter individually associated with the physical experiment entity based on a training loss applied to the first numerical output computed using the critic function and the first action parameter of the physical experiment entity, the training loss applied to the first numerical output and the first action parameter encoding a predicted information gain between the first predicted experiment outcome associated with the physical experiment entity and the first predicted test quantity associated with the physical test entity;

sample a second predicted experiment outcome associated with the physical experiment entity and a second predicted test quantity associated with the physical test entity from a second joint probability distribution based on: the first context, the second context, and the second action parameter of the physical experiment entity;

compute a second numerical output using the critic function applied to the second predicted experiment outcome associated with the physical experiment entity and the second predicted test quantity associated with the physical test entity;

determine, for the physical experiment entity, a third action parameter individually associated with the physical experiment entity based on the training loss applied to the second numerical output computed using the critic function and the second action parameter of the physical experiment entity, the training loss applied to the second numerical output and the second action parameter encoding a predicted information gain between the second predicted experiment outcome associated with the physical experiment entity and the second predicted test quantity associated with the physical test entity;

output an experiment design based on the third action parameter, wherein a real-world experiment action according to the experiment design is performed on the physical experiment entity to obtain a real-world experiment result;

determine a real-world test action individually associated with the physical test entity by updating a probability distribution of outcomes using the real-world experiment result and applying the updated probability distribution to the first context; and cause the real-world test action to be performed on the physical test entity.

17. The computer system of claim 16, wherein the computer-readable instructions are configured to cause the processor to:

sample a third predicted experiment outcome associated the physical experiment entity and a third predicted test quantity associated with the physical test entity from a third joint probability distribution based on: the first context, the second context, and the third action parameter of the physical experiment entity;

compute a third numerical output using the critic function applied to the third predicted experiment outcome associated with the physical experiment entity and the third predicted test quantity associated with the physical test entity; and determine, for the physical experiment entity, a fourth action parameter individually associated with the physical experiment entity based on the training loss applied to the third numerical output computed using the critic function and the third action parameter of the physical experiment entity, the training loss applied to the third numerical output and the third action parameter encoding a predicted information gain between the third predicted experiment outcome associated with the physical experiment entity and the third predicted test quantity associated with the physical test entity; and wherein the experiment design is additionally based on the fourth action parameter.

18. The computer system of claim 16, wherein the computer-readable instructions are configured to cause the processor to output the experiment design via a graphical user interface associated with the computer system.

19. The computer system of claim 16, wherein:

the critic function is parameterised by a first critic parameter, wherein the first numerical output is computed using the first critic parameter; and a second critic parameter is computed based on the training loss applied to the first numerical output and the second action parameter of the physical experiment entity, wherein the second numerical output is computed using the critic function applied to the second predicted experiment outcome, the second predicted test quantity, and the second critic parameter.

20. Computer-readable storage media embodying computer-readable instructions configured, when executed on a computer processor, to cause the computer processor to carry out operations comprising:

computing an initial value of a critic parameter;

computing, for a physical experiment entity of a plurality of experimental entities, an initial value of an action parameter individually associated with the physical experiment entity;

computing, in a sequence of training iterations, an updated value of the critic parameter and an updated value of the action parameter, the sequence including:

an initial training iteration based on the initial value of the critic parameter and the initial value of the action parameter, and a subsequent training iteration for updating the critic parameter and the action parameter, based on a value of the action parameter computed in a preceding one of the training iterations, wherein a training iteration of the sequence comprises:

sampling, for the physical experiment entity, a predicted experiment outcome from a joint probability distribution, the predicted experiment outcome being associated with the physical experiment entity;

sampling, for a physical test entity, a predicted test quantity associated with physical test entity, wherein the joint probability distribution is based on: a context of the physical experiment entity, a context of the physical test entity, and the action parameter, computing a numerical output using a critic function parameterised by the critic parameter and applied to the predicted experiment outcome and the predicted test quantity, and updating, using the numerical output, the critic parameter and the action parameter based on a training loss that is dependent on the critic function and the action parameter and that encodes a predicted information gain between the predicted experiment outcome and the predicted test quantity; updating, using the numerical output, the critic parameter and the action parameter based on a training loss that is dependent on the critic function and the action parameter and that encodes a predicted information gain between the predicted experiment outcomes and the predicted test quantity;

outputting, for the physical experiment entity, an indication of a real-world experiment action defined by the updated value of the action parameter;

determining a real-world test action individually associated with the physical test entity based on an outcome of the real-world experiment action performed on the physical experiment entity; and causing the real-world test action to be performed on the physical test entity.

* * * * *